United States Patent [19]
Shimazaki et al.

[11] 3,788,751
[45] Jan. 29, 1974

[54] GAS ANALYZER

[75] Inventors: Toshio Shimazaki; Fumio Tanei; Yoshio Yanagida, all of Kyoto, Japan

[73] Assignee: Horiba Ltd., Kyoto-Fu, Japan

[22] Filed: Aug. 31, 1971

[21] Appl. No.: 176,660

[52] U.S. Cl. .............................................. 356/246
[51] Int. Cl. ................................................ G01n 1/10
[58] Field of Search .... 356/51, 246, 244; 250/43.54

[56] References Cited
UNITED STATES PATENTS
3,361,026   1/1968   Ishimaru ............................ 356/246
2,744,440   5/1956   Robertson et al. ................. 356/246

Primary Examiner—William L. Sikes
Attorney, Agent, or Firm—Hall and Houghton

[57] ABSTRACT

A gas analyzer comprising a sample cell adapted to receive a gas to be analyzed and a reference cell for receiving a gas to be compared, both of which are disposed between a source of light and a detector, and clamping members for clamping together a protective casing and a common cell base for support of said sample and reference cells. Other advantages and details of the arrangement will be made clear.

5 Claims, 3 Drawing Figures

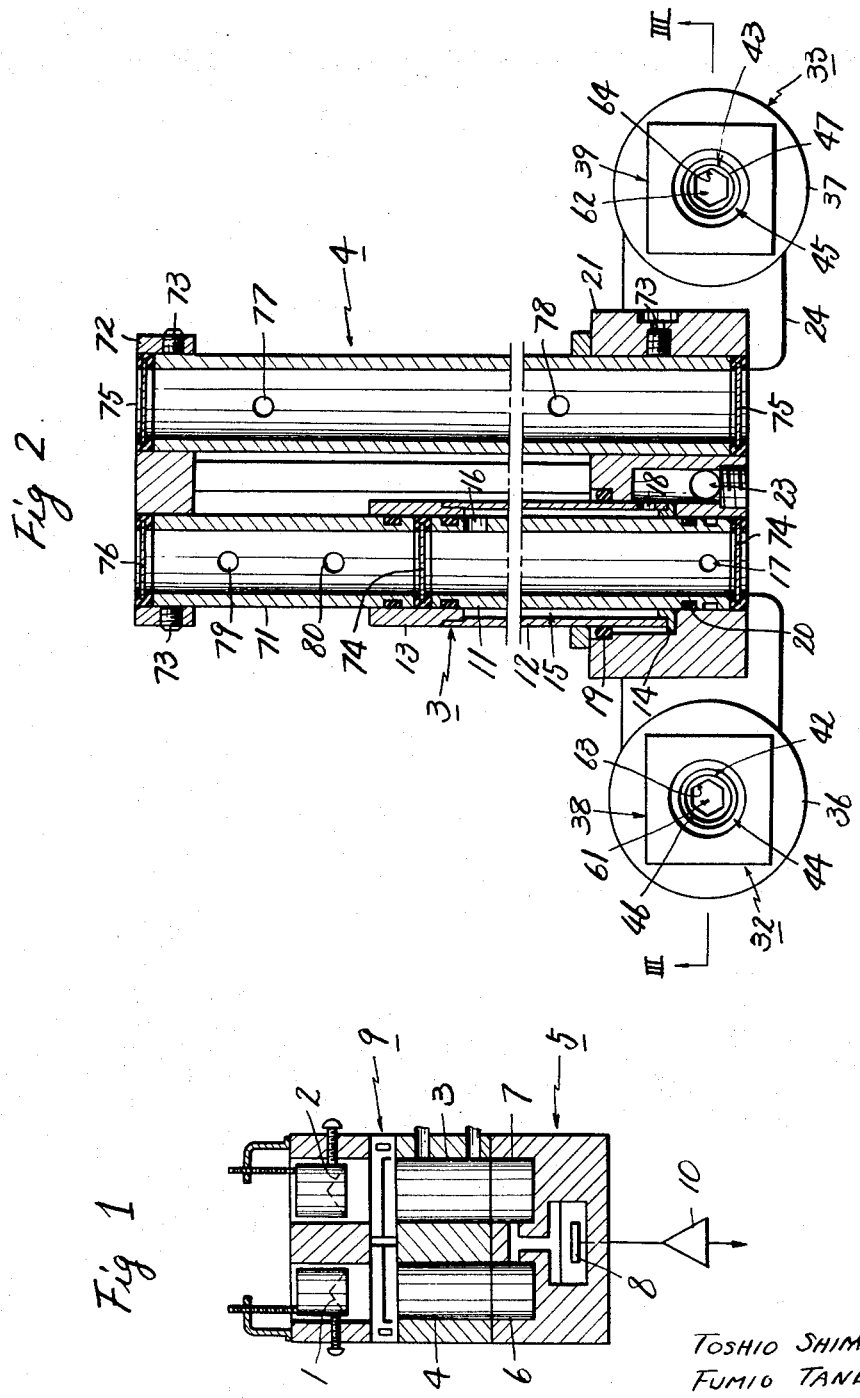

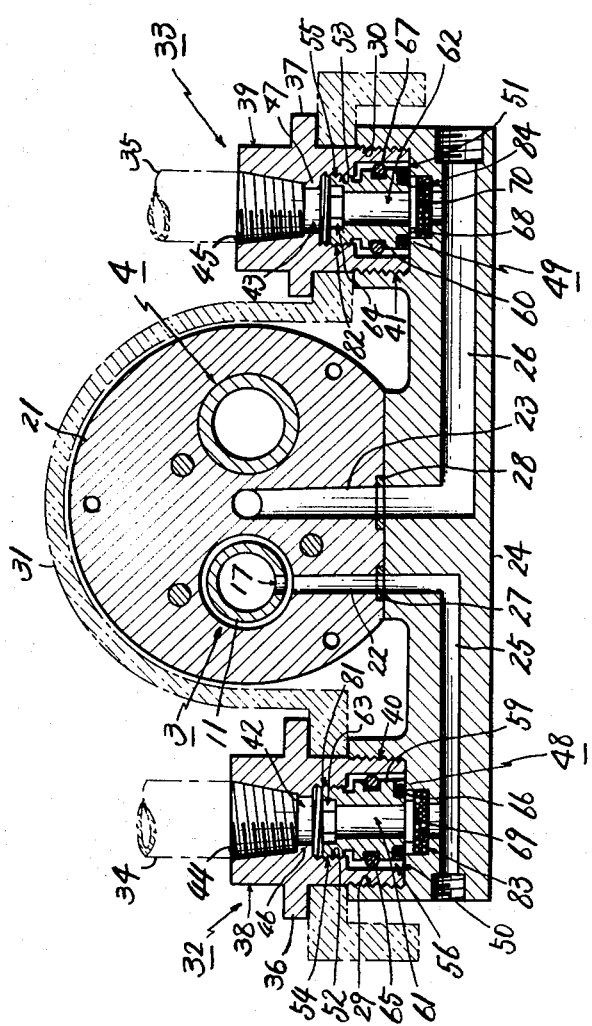

GAS ANALYZER

BACKGROUND OF THE INVENTION

1. Field of the Invention

The present invention relates to arrangements of the gas receiving means, piping construction and assembling construction in infrared gas analyzers, ultraviolet gas analyzers, colorimetric analyzers and other various gas analyzers.

2. Description of the Prior Art

Generally, it is necessary to change the length of the sample receiving means, i.e., gas receiving cell in gas analyzers according to the amount and concentration of a sample gas and to clean said cell after analysis. Therefore, said cell, protective casing for the cell, gas piping, etc. have to be attached and detached each time gas analysis is conducted. Heretofore, the means for fixing said cell and protective casing together, the joints between the cell and gas piping and between the gas piping and protective casing, etc. have been separate from and independent of each other and thus the joint constructions are very complex. As a result, the attachment and detachment of such parts take much trouble.

SUMMARY OF THE INVENTION

According to the present invention, a sample cell for receiving a gas to be analized is of a double pipe construction and a gas piping for said sample cell is placed in the cell. The sample cell and a reference cell for receiving a gas to be compared are retained by a common cell base, and metal fixtures for said cell base and protective casing are utilized to enable gas introducing and discharging pipes to be attached and detached from outside the protective casing. This arrangement makes it possible to eliminate the presence of the gas piping for sample cell from within the analyzing system, which elimination, in turn, makes it possible to simplify the construction of the analyzing system, reduce the size thereof, simplify the disassembly and assembly of the analyzing system and facilitate the attachment and detachment of the gas piping, i.e., gas introducing and discharging pipes.

DESCRIPTION OF THE DRAWINGS

In the accompanying drawings illustrating a preferred embodiment of the invention:

FIG. 1 is a schematic view of a double light path type infrared gas analyzer;

FIG. 2 is a side view in longitudinal section of cell means which is the principal portion of the present invention, with sample gas introducing and discharging regions shown in front view; and FIG. 3 is a cross-section taken along the line III—III of FIG. 2.

DETAILED DESCRIPTION OF THE INVENTION

The outline of a double light path type infrared gas analyzer will be given with reference to FIG. 1. The difference between infrared energies emitted from light sources 1 and 2 and transmitted through a sample cell 3 and a reference cell 4, respectively, is selectively absorbed by a detector 5 and the detected energy difference is derived as a pressure difference between the chambers 6 and 7 of the detector and is then converted into an electric signal by a capacitor microphone 8, thereby detecting the concentration of the sample gas. Further, in order to facilitate the conversion into electric signals at the detector, the light paths are periodically interrupted to provide an a.c. waveform. The numeral 10 denotes an amplifier.

The present invention is concerned with the above-mentioned gas analyzer, and the gist of the invention is directed particularly to the cell construction, gas piping construction and assembling construction. These arrangements will now be described with reference to FIGS. 2 and 3.

The sample cell 3 includes an inner pipe 11 and an outer pipe 12 hermetically secured at each end to the inner pipe 11 in spaced encircling relationship by means of a sleeve 13 and a ring 14. This construction results in the formation of an annular clearance passageway 15 between the inner and outer pipes 11, 12. A communication port 16 is provided in the end portion of the inner pipe 11 and thereby establishes communication between the formed clearance passageway 15 and inner pipe 11. The inner pipe 11 is of a length greater than the outer pipe 12 and, as illustrated, extends beyond the confines of the outer pipe 12 forming an upper extension and a lower extension with respect thereto. A gas inlet 17 is provided in the lower extension of the inner pipe 11. The end of the outer pipe 12 adjacent the lower extension of the inner pipe 11 having the gas inlet 17 is provided with a gas outlet 18. In short, the purpose of this construction is to provide gas inlet and outlet 17 and 18 in the inner and outer pipes 11 and 12, respectively, at the same end of the sample cell 3 so that a sample gas which enters the sample cell 3 through the gas inlet 17 may be passed from the inner pipe 11 through the communication port 16 into the formed clearance passageway 15 and then pass from the cell 3 through the outlet 18 at the same end of the cell.

The end portion of the sample cell 3 on the end provided with said inlet and outlet 17 and 18 is hermetically fitted in a cell receiver 21 by means of 0-ring packings 19 and 20. The cell receiver 21, as shown in FIG. 3, is provided with communication holes 22 and 23 communicating with the inlet and outlet 17 and 18 of the sample cell 3, respectively. The cell receiver 21, as shown in FIG. 3 also, is suitably fixed to a cell base 24 provided with gas and introducing and discharging holes 25 and 26 communicating with the communication holes 22 and 23 of the cell receiver 21, respectively. The junctions between the communication holes 22, 23 and the gas introducing and discharging holes 25, 26 are provided with 0-ring packings 27, 28, respectively, which assist in hermetically fixing them together.

As shown in FIG. 3, the gas introducing and discharging holes 25 and 26 extend in the cell base in opposite directions, the front end thereof being opened in a direction perpendicular to the gas introducing and discharging holes, and the openings are internally threaded to provide threaded holes 29 and 30. Metal fixtures 32 and 33 are screwed into said threaded holes 29 and 30, respectively.

The metal fixtures 32 and 33 serve to assemble a protective casing 31 to the cell base 24 and also to connect the sample gas introducing and discharging pipes 34 and 35 to the gas introducing and discharging holes 25 and 24 in the cell base, respectively.

The metal fixtures 32 and 33, as shown in FIG. 3, have flanges 36 and 37, respectively, integrally formed around their outer peripheries. One of the distinct outer peripheral regions thus partitioned off from each other by such flange is shaped square to provide nut portions 38 and 39, and the other respective regions are threaded as at 40 and 41. The metal fixtures 32 and 33 have through holes 42 and 43 partitioned by steps 46 and 47, respectively. One of the sides of each step 46, 47 corresponding to the nut portion is threaded to provide threaded holes 44 and 45, into which gas introducing and discharging pipes 34 and 35 are screwed. Further, the other respective sides partitioned by the steps 46 and 47 are formed as receiving portions 50 and 51 for seal screw sleeves 48 and 49. The receiving portions 50 and 51 consist of inner reduced receiving regions 81 and 82 and enlarged receiving regions 56 and 57, said reduced receiving regions 81 and 82 being internally threaded to provide internal threads 52 and 53 for threaded reception of the external threads 54 and 55 of the seal screw sleeves 48 and 49. The seal screw sleeves 48 and 49 consist of external threads 54 and 55 adapted for threaded engagement with the internal threads 52 and 53 of said reduced receiving portions 81 and 82, and portions 59 and 60 adapted to be fitted in said enlarged receiving portions 56 and 57, and there are centrally provided gas flow holes 61 and 62. At the inner ends of the gas flow holes 61 and 62, i.e., on the side where the external threads 54 and 55 exist, square holes 63 and 64 are formed. Further, the portions 59 and 60 are externally provided with grooves for mounting 0-ring packings 65, 66 and 67, 68 thereon.

The innermost regions of the threaded holes 29 and 30 opened at the opposite ends of the cell base 24 are provided with recesses 83 and 84 for installing therein filter members 69 and 70 such as of a sintered alloy.

The filters 69 and 70 are pressed in position in the openings at the gas introducing and discharging holes 25 and 26 by means of the seal screw sleeves 48 and 49 to remove dust contained in a sample gas and to eliminate any possibility of spread of backfire outside an analizer especially provided with an explosion-proof capability. A filter cell 71 is fitted in and secured to the sleeve 13 at the end of the sample cell 3.

The reference cell 4 for receiving a reference gas is fitted in the cell receiver 21 on the one hand and on the other hand in a cell receiver 72, these receivers similarly serving also for the sample cell 3. These two cells, as shown in FIGS. 2 and 3, are fixed to the cell receivers 21 and 72 by set screws 73.

The opposite ends of the cells 3, 4 and filter cell 71 are closed by plates 74, 75 and 76 formed of a light-transmitting material such as lithium fluoride, sapphire and qualtz. In addition, in FIG. 2, the numerals 77 and 79 denote gas filling ports for the reference and filter cells, respectively, and the numerals 78 and 80 denote gas discharging ports for the reference and filter cells, respectively.

In conducting gas analysis, a reference gas of given concentration is introduced into the reference cell 4, while a sample gas to be analyzed is fed to the sample cell 3 through the introducing pipe. The sample gas is passed from the introducing pipe through the gas introducing hole 25 of the cell base into the gas inlet 17 of the sample cell 3, wherefrom it is passed through the inner pipe 11, through the communication port 16 and then through the annular clearance passageway 15 and into the gas outlet 18, wherefrom it is passed through the communication port 23 of the cell receiver 21 and is finally discharged from the discharging pipe via the gas discharging hole 26 of the cell base 24. In this condition, infrared rays, ultraviolet rays or other rays of light are emitted to one end of each of the reference and sample cells 4 and 3 and the transmittances, colors, etc. of the transmitted rays of light are compared with each other for measurement.

In some cases, a suitable gas may be filled in the filter cell 71 in order to remove the obstructive component of the gas to be analyzed. In addition, the principle of the gas analysis is the same as that of the conventional gas analyzer.

As has been described so far, according to the present invention, the sample cell means is in the form of a double pipe; gas inlet and outlet are provided on one side; the annular clearance passageway communicates with the gas inlet and outlet; and the annular clearance passageway, which is defined between the inner and outer pipes, communicates at the other end with the interior of the inner pipe. This arrangement enables the piping within the analyzing system to be assembled in the cell section. As a result, it is possible to substantially eliminate the presence of the piping of the sample cell from within the analyzing system and greatly facilitate the attachment and detachment of the cell at the time of replacement and cleaning of the cell.

Especially when the protective casing should be made explosion-proof with a pressure resistant construction, any piping within the casing which naturally requires an additional space is dispensable. As the result, the casing is compact, inexpensive and easier in handling.

Further, according to the invention, the metal fixtures for clamping the protective casing and cell base together are each provided with a gas passageway extending therethrough; a seal screw sleeve having a gas flow hole is screwed into each said gas passageway; and after the protective casing and cell base are fixed together by said metal fixtures, the seal screw sleeves establish gas-tight communication between the gas passageways in the metal fixtures and the gas introducing and discharging holes in the cell base. This arrangement enables the cell of double pipe construction to be attached and detached simultaneously with the attachment and detachment of the casing. Therefore, the cleaning of the cell section is simplified and facilitated.

Further, according to the invention, since the innermost regions of the threaded holes in the cell base are provided with recesses, and filter members formed of a sintered alloy or the like are fitted in the recesses and secured in position by the seal screw sleeves, dust which may be contained in a gas to be analyzed can be removed, and in cases where a sample gas in the gas analyzer provided with an explosion-proof construction is irradiated with a heat ray such as infrared ray, spread of any resultant flame outside the analyzer is successfully prevented.

While there have been described herein what are at present considered preferred embodiments of the several features of the invention, it will be obvious to those who have engaged in development and research of gas analyzer that modifications and changes may be made without departing from the principle of the invention. It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. A gas analyzer comprising a reference cell for receiving a sample gas to be compared, a double wall sample cell for receiving a gas to be analyzed, said sample cell including an inner pipe and an outer pipe forming a sealed annular clearance passageway therebetween through which gas will pass, inlet means at one end of said inner pipe, outlet means at the end of said outer pipe contiguous with the end of said inlet pipe having the inlet means, and an opening in said inner pipe remote from the inlet means forming a connecting passageway between the inner pipe and an outer pipe to the formed annular clearance passageway, a common cell receiver for receiving and supporting said two cells, a cell base for said receiver, said base having gas introducing and discharging openings therein, a casing for protecting said two cells and metal fixture means for clamping said cell base and said casing together and establish an operative communicating relationship between said gas introducing and discharging openings of said base with said inlet means and said outlet means of the inner and outer pipes respectively.

2. A gas analyzer in accordance with claim 1, wherein said gas introducing openings and said gas discharging openings extend in opposite directions and each of said openings being threaded for threaded reception of the metal fixtures having gas passageways.

3. A gas analyzer as set forth in claim 2 having seal screw sleeves, wherein the innermost region of each opening in the cell base is provided with a recess in which a filter member formed of a sintered alloy or the like is fitted and, after the tightening of the metal fixtures, said filter members are secured in position in the recesses by the seal screw sleeves.

4. A gas analyzer as set forth in claim 3, wherein each of the seal screw sleeves to be received in the associated metal fixtures has a through hole and is externally threaded at one end thereof for threaded engagement in the threaded hole in the innermost region of the receiving portion, and the end of the through hole on the threaded side terminates in a square hole to permit the tightening of the associated seal screw sleeve from outside the associated metal fixture, and the outer peripheral region other than the threaded region is provided with an annular groove for receiving an 0-ring packing therein.

5. A gas analyzer as set forth in claim 1 and having seal screw sleeves, wherein each metal fixture has a through hole in the center and a flange around the outer periphery thereof, and one of the distinct regions thus partitioned off from each other by the flange is internally threaded and externally shaped square, while the other is internally formed with a portion for receiving the associated seal screw sleeve therein and externally threaded for threaded engagement in the associated threaded hole in the cell base.

* * * * *